Patented Feb. 3, 1931                                                                1,791,432

UNITED STATES PATENT OFFICE

MAX SCHMID, OF RIEHEN, NEAR BASEL, AND FRITZ STRAUB, OF BASEL, SWITZERLAND, ASSIGNORS TO SOCIETY OF CHEMICAL INDUSTRY IN BASLE, OF BASEL, SWITZERLAND

AZO DYESTUFFS AND PROCESS OF MAKING SAME

No Drawing. Application filed July 19, 1928, Serial No. 294,044, and in Switzerland July 26, 1927.

This invention relates to the manufacture of new dyestuffs by coupling a diazo-compound containing an OH-group in ortho-position to the diazo-group with pyrazolone derivatives of the general formula

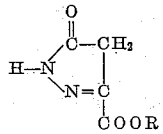

wherein R signifies hydrogen or alkyl, and which are produced by the condensation of an oxalo-acetic acid ester with hydrazine. Such pyrazolone derivatives are for instance the 5-pyrazolone-3-carboxylic acid and the methyl or the ethyl ester of this acid.

The azodyestuffs thus obtained correspond with the general formula

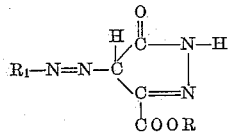

wherein $R_1$ means an aromatic complex containing an OH-group in ortho-position to the azo-bridge and R has the signification as above stated. The products are yellow to orange or dark brown powders which dissolve in the suitable solvents with yellow to orange, red or brown colorations.

The products thus obtained may be further converted by treatment with agents yielding metal, such as copper compounds or chromium compounds, into dyestuffs containing metal which themselves have valuable dyeing properties.

If one intends to produce mordant dyestuffs which may also be used for the manufacture of dysteuffs containing metal, one will start from such diazo-compounds which contain in ortho-position to the diazo-group an OH-group. Here there are particularly valuable those dyestuffs which derive from the 5-pyrazolone-3-carboxylic acid and from the sulfonated, if necessary also halogenated, diazo-compounds. The dyestuffs so obtainable correspond with the general formula—

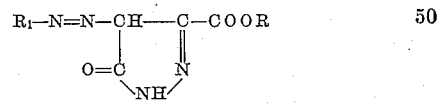

wherein $R_1$ means any aromatic complex that carries in ortho-position to the diazo-group an OH-group, and R means hydrogen or alkyl. They constitute orange to brown-red powders which are soluble in dilute sodium carbonate solution with yellow to orange and brown coloration.

The following examples illustrate the invention, the parts being by weight:—

*Example 1*

22.3 parts of 4-chloro-2-amino-phenol-6-sulfonic acid are diazotized and coupled with 12.8 parts of 5-pyrazolone-3-carboxylic acid. The dyestuff, which is salted out, forms a red-brown powder, dissolving in dilute sodium carbonate solution with brown coloration. It corresponds with the formula

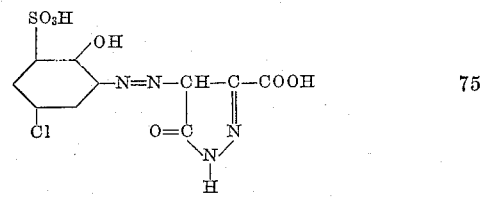

and dyes wool in an acid bath orange tints, which become blue-red on after-chroming and are fast, particularly to light. The dyestuff from 4-chloro-2-amino-phenol-5-sulfonic acid behaves similarly. If for the chloraminophenolsulfonic acid there is substituted 4-nitro-2-aminophenol-6-sulfonic acid or 6-nitro-2-aminophenol-4-sulfonic acid, there are obtained products which, when dyed on wool and after chromed, yield red-brown to brown tints. The dyestuffs from the pyrazolone-3-carboxylic acid esters are somewhat brighter. With diazotized 1:2-aminonaphthol-4-sulfonic acid or its nitro-derivative there is obtained a dyestuff which dyes violet or bordeaux on after-chroming. In chrome printing on cotton the aforesaid dyestuff from diazotized 1:2-aminonaphthol-4-sulfonic acid yields violet tints fast to washing.

When these dyestuffs are treated with agents that yield copper there are obtained wool dyestuffs which dye yellow-brown to red-brown; the corresponding chromium compounds dye yellow to blue-red and violet.

Example 2

40 parts of the dyestuff from 1-diazo-2-naphthol-4-sulfonic acid and 5-pyrazolone-3-carboxylic acid are dissolved in 1000 parts of boiling water, mixed with 22.8 parts of $Cr_2O_3$ in the form of a solution containing 4 per cent. of chromium fluoride, and then boiled until the chromium compound has been formed. The same may be obtained by evaporation or by evaporation in part and salting out. It constitutes a blackish powder which dissolves in water and in caustic soda solution of 10 per cent. strength to a red-violet solution, and in concentrated sulfuric acid to a violet-brown solution, dyeing wool from a dyeing bath acidulated with sulfuric acid fast brown-violet tints. The manner in which the chromium is bound with the dyestuff is not known.

Example 3

47.3 parts of the dyestuff from nitrated 1-diazo-2-naphthol-4-sulfonic acid and 5-pyrazolone-3-carboxylic acid ethyl ester are dissolved in 1000 parts of boiling water, mixed with 22.8 parts of $Cr_2O_3$ in the form of a solution containing 4 per cent. of chromium fluoride, and then boiled until the dyestuff containing chromium has been formed. The same can be obtained by evaporation or by evaporation in part and salting out. It constitutes a blackish powder which dissolves in water and caustic soda solution of 10 per cent. strength to a blue-red solution, and in concentrated sulfuric acid to a violet-brown solution, dyeing wool from a dyeing bath acidulated with sulfuric acid fast red tints. The manner in which the chromium is bound with the dyestuff is not known.

Example 4

42.3 parts of the dyestuff from 6-nitro-4-sulfo-2-amino-1-phenol and 5-pyrazolone-3-carboxylic acid ethyl ester are dissolved in 1000 parts of boiling water, mixed with 22.8 parts of $Cr_2O_3$ in the form of a solution containing 4 per cent. of chromium fluoride, and then boiled until the dyestuff containing chromium has been formed. The same may be obtained in the usual manner. It constitutes a brown powder which dissolves in water and in aqueous caustic soda solution to a red solution, and in concentrated sulfuric acid to an orange solution, dyeing wool from a bath acidulated with sulfuric acid fast red tints. The manner in which the chromium is bound with the dyestuff is not known.

Example 5

Goods are dyed with 1 per cent. of the dyestuff made as described in Example 4 from 4-chloroaminophenol-6-sulfonic acid and 5-pyrazolone-3-carboxylic acid with addition of 1–3 per cent. of acetic acid and 10 per cent. of Glauber's salt. The goods are introduced at 60° C., the bath is heated gradually to boiling and boiling is continued for ½ to ¾ hour. The bath then receives an addition of 1–2 per cent. of sulfuric acid and boiling is continued for ¼ hour. There is then added 1 per cent. of potassium bichromate and boiling is further continued to develop fully the shade. The red dye thus obtained is characterized by its fastness to light. Dyeing may also be conducted in any other manner hitherto usual for dyeing with chrome dyestuffs.

What we claim is:—

1. The manufacture of azo-dyestuffs by coupling pyrazolones of the general formula

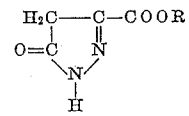

wherein R signifies hydrogen or an alkyl group, with diazo-compounds which contain in ortho-position to the diazo-group a hydroxyl group.

2. The manufacture of azo-dyestuffs by coupling pyrazolones of the general formula

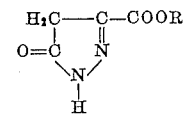

wherein R signifies hydrogen or an alkyl group, with diazo-compounds which contain in ortho-position to the diazo-group a hydroxyl group, and by treating the azo-dyestuffs thus obtained with agents yielding chromium.

3. As new products the azo-dyestuffs corresponding with the general formula

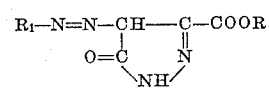

wherein $R_1$ means any aromatic complex that carries in ortho-position to the diazo-group a hydroxyl group, and R means hydrogen or alkyl, which constitute orange to brown-red powders which are soluble in dilute sodium carbonate solution with yellow to orange and brown coloration.

4. As new products the chromium compounds of azo-dyestuffs of the general formula

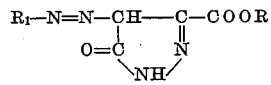

wherein $R_1$ means any aromatic complex that carries in ortho-position to the diazo-group a hydroxyl group, and R means hydrogen or alkyl, which products form dark powders dissolving in water and dilute sodium carbonate solution with dark red to brown and violet coloration.

5. The material dyed with the dyestuffs of claim 3.

6. The material dyed with the dyestuffs of claim 4.

In witness whereof we have hereunto signed our names this 7th day of July, 1928.

MAX SCHMID.
FRITZ STRAUB.